No. 686,188. Patented Nov. 5, 1901.
P. D. ANDERSEN.
CHECK ROW ATTACHMENT FOR PLANTERS.
(Application filed June 10, 1901.)
(No Model.)
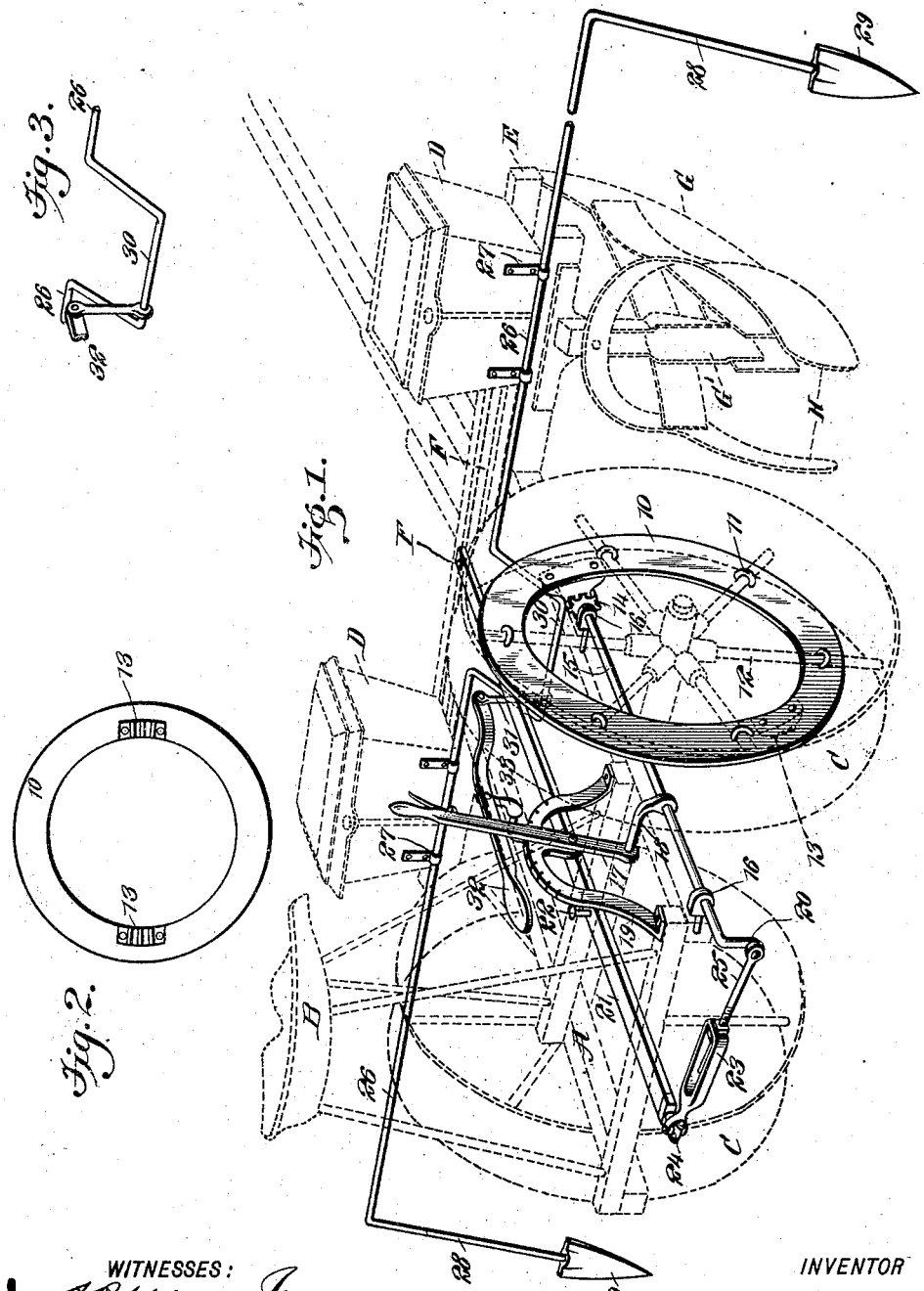
WITNESSES:
INVENTOR
Peter D. Andersen
BY
ATTORNEYS

UNITED STATES PATENT OFFICE.

PETER DIGE ANDERSEN, OF MINDEN, NEBRASKA.

CHECK-ROW ATTACHMENT FOR PLANTERS.

SPECIFICATION forming part of Letters Patent No. 686,188, dated November 5, 1901.

Application filed June 10, 1901. Serial No. 63,890. (No model.)

*To all whom it may concern:*

Be it known that I, PETER DIGE ANDERSEN, a citizen of the United States, and a resident of Minden, in the county of Kearney and State of Nebraska, have invented a new and Improved Check-Row Attachment for Planters, of which the following is a full, clear, and exact description.

The purpose of the invention is to provide a check-row attachment, including a marker, which may be applied to any type of planter, and to provide a means whereby the seed-drop slide is operated at intervals from one of the ground or supporting wheels for the planter, means being provided for throwing the drop-slide-operating mechanism into or out of working contact with the said supporting-wheel and to effect the change in a convenient and expeditious manner.

A further purpose of the invention is to provide a lever for the marker-shaft, so coupled thereto that the driver may quickly and at any time lower or raise the marker to or from the ground.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the planter drawn in dotted lines and a perspective view of the attachment drawn in positive lines, the attachment being shown in position on the planter. Fig. 2 is an inner face view of a ring which is adapted for attachment to one of the driving or supporting wheels of the planter, and Fig. 3 is a detail perspective view of a crank forming a portion of the marker-shaft and illustrating the manner in which an operating-lever for the said shaft is applied to the said crank.

A represents the body of the planter; B, the seat; C, the supporting or ground wheels; D, the seedboxes, which are mounted upon horizontal head-beams E in the customary way, and F represents the seed-drop slide for the boxes, which may be constructed to drop seed simultaneously from both boxes or intermittently from the boxes. G represents one of the runners, G' the boot to conduct the seed to the ground from a box, and H represents the covering devices for the seed. All of these parts mentioned may be of any suitable or approved construction.

A ring 10 is attached by clamps 11 or equivalent devices to the spokes 12 of one of the supporting-wheels C, and this ring is provided upon its inner face usually with two diametrically opposite toothed segments 13, although more than two segments may be employed in connection with the ring or but a single segment may be used. As the wheel C revolves these segments engage with a pinion 14, secured upon a shaft 15, supported in suitable bearings 16 at one side of the frame A. This shaft 15 is capable of rotary and of end movement in its bearings 16, and the end movement is imparted to the shaft 15 through the medium of a lever 17, connected with the shaft 15 by an arm 18, the connection being made in such manner as not to interfere with the rotation of the said shaft 15. The lever 17 is fulcrumed upon a rack 19 or upon any suitable support adjacent to the rack, and the lever 17 is provided with a thumb-latch to enter notches or engage with teeth carried by the rack. A crank-arm 20 is formed at the rear end of the shaft 15, and an operating-bar 21 for the seed-drop slide is fulcrumed upon the frame A through the medium of a suitable pin 22, the forward end of said bar 21 being attached to the seed-drop slide F at F', as is shown in Fig. 1. At the rear end of the manipulating-bar 21 for the seed-drop slide the loop member 23 of a single turnbuckle has a universal connection 24 with the said bar 21, and a rod 25, which is screwed in the loop 23 of the said turnbuckle, is pivotally attached to the crank-arm 20 of the shaft 15. This adjustable connection between the drop-slide-manipulating rod or bar 21 and the shaft 20 is made in order that the throw of the said drop-slide in its passage through the seedboxes may be increased or decreased, as desired. A marker-shaft 26 extends across the frame A of the machine some distance beyond the sides of the frame and parts carried by the head-beams E of the frame, the said marker-shaft 26 being journaled in bearings 27, shown secured to the rear portions of the seedboxes D.

The marker-shaft 26 is provided with a downwardly-extending member 28 at each of its ends, and at the extremity of each of said members 28 a marker 29 is secured, which marker may be of any desired shape, that shown in the drawings approximating the shape of an arrow-head. At the central portion of the marker-shaft 26 a crank-arm 30 is secured, extending in a rearward direction, and a link 31 is attached to the rear member of this crank-arm and to one end of a foot-lever 32, fulcrumed upon a suitable support 33, carried by the frame of the planter, so that whenever it is needed the driver by operating the foot-lever 32 may rock the marker-shaft 26 and carry the markers 29 from engagement with the ground, and when the lever 32 is relieved from pressure the markers will gravitate to an engagement with the ground.

I desire it to be understood that I contemplate attaching the improvement to all kinds of planters, no matter what form of drop they may have, as such adaptation may be made without departing from the spirit of the invention.

Having thus described my invention, I claim as new and desire to secure by Letters Patent—

1. An attachment for planters consisting of a toothed segment, means for securing the segment to the inner face of a driving-wheel, a shaft capable of end and rotary movement, a driving connection between the shaft and the said toothed segment, a manipulating-bar for the seed-drop slide of the planter, and a driving connection between the shaft and the manipulating-bar for the drop-slide as described.

2. An attachment for planters, consisting of a plate adapted for attachment to a supporting or driving wheel of the planter, a toothed segment secured upon the inner face of the said plate, a shaft, bearings for the shaft, in which bearings the shaft is capable of end and of rotary movement, a pinion carried by the shaft, adapted for engagement with the toothed segment on the plate, a pivoted manipulating-bar for a seed-drop slide, and a connection between a crank-arm on the said shaft and the said manipulating-bar for the drop-slide, as described.

3. An attachment for planters, consisting of a ring adapted for attachment to a supporting or ground wheel of a planter, the ring being provided with diametrically opposite toothed segments upon its inner face, a shaft mounted to turn in bearings and to slide in said bearings, the shaft being provided with a crank-arm at one end and with a pinion adapted to mesh with the teeth of the segments on the said ring, a pivoted manipulating-bar adapted for attachment at one end to a seed-drop slide, and a turnbuckle having pivotal connection with the crank-arm of the shaft and a universal connection with an end of the pivoted manipulating-bar for the seed-drop slide, for the purpose set forth.

4. The combination, with the frame and the ground or supporting wheels of a planter, of a ring secured to one of said wheels, toothed segments attached to the inner face of the said ring, a shaft, mounted to slide and turn in bearings attached to the frame of the planter, a shifting device for the said shaft, a crank-arm located at one end of the shaft, and a pinion at the opposite end, which pinion is arranged for engagement with the toothed segments on said ring, a manipulating-bar pivoted to the frame, having its forward end connected with the seed-drop slide of the planter, and a single turnbuckle having a universal connection with the rear end of the manipulating-bar and a pivotal connection with the crank-arm of the shaft.

5. In a planter, the combination, with the frame thereof, of a marker-shaft mounted to rock upon the said frame, the said shaft having downwardly-extending arms at its extremities, and marking-points at the extremities of the said arms, the said shaft being provided with a crank-arm between its ends, a lever fulcrumed upon the frame, and a link connection between the said lever and the crank-arm of the shaft, for the purpose set forth.

In testimony whereof I have signed my name to this specification in the presence of two subscribing witnesses.

PETER DIGE ANDERSEN.

Witnesses:
M. D. KING,
P. J. YOUNGSON.